United States Patent [19]

Eickmann

[11] 4,405,103
[45] Sep. 20, 1983

[54] HYDRAULICALLY OPERATED AIR BORNE ROTOR CRAFT

[76] Inventor: Karl Eickmann, 2420 Isshiki, Hayama-machi, Kanagawa-ken, Japan

[21] Appl. No.: 121,186

[22] Filed: Feb. 13, 1980

Related U.S. Application Data

[60] Division of Ser. No. 954,555, Oct. 25, 1978, Pat. No. 4,358,073, and a continuation-in-part of Ser. No. 800,755, May 26, 1977, abandoned, and Ser. No. 800,489, May 25, 1977, abandoned, said Ser. No. 954,555, is a continuation of Ser. No. 800,756, May 26, 1977, abandoned, which is a continuation of Ser. No. 465,413, Apr. 30, 1974, abandoned, said Ser. No. 800,755, and Ser. No. 800,489, each is a continuation of Ser. No. 465,413.

[30] Foreign Application Priority Data

May 4, 1973 [AT] Austria ............................ 3968/73

[51] Int. Cl.³ .......................................... B64D 35/00
[52] U.S. Cl. ................................. 244/60; 244/17.11
[58] Field of Search ............... 244/12.1, 12.3, 53 R, 244/69, 17.23, 17.11, 55; 280/782; 180/225, 305, 308, 307; 290/205; 417/273; 428/22

[56] References Cited

U.S. PATENT DOCUMENTS

| | | | |
|---|---|---|---|
| 3,253,806 | 5/1966 | Eickmann | 244/17.23 |
| 3,253,807 | 5/1966 | Eickmann | 244/17.23 |
| 3,398,698 | 8/1968 | Eickmann | 417/273 |
| 3,497,162 | 2/1970 | Eickmann | 244/12.1 |
| 3,614,029 | 10/1971 | Eickmann | 244/17.23 |
| 3,690,398 | 9/1972 | Hause | 280/782 |

*Primary Examiner*—Galen L. Barefoot

[57] ABSTRACT

A helicopter-like craft has plural propellers with substantial vertical axes which can be inclined forwardly to provide the forward movement of the vehicle. The propellers are driven by hydraulic fluid motors. One embodiment features the application of a four flow hydraulic pump which supplies two pairs of hydraulic pressure fluid flows, wherein the rate of flow in fluid in each flow of the pairs are equal. One of the pairs of flows may be of permanently fixed rate of flow but the flows of the other pair of flows is variable, but variable in such a system, that even at variation of rate of flow the rate of flow of the two flows of the variable flow—pair remains equal relatively to the other flow of the pair. This system of hydraulic drive is utilized to let the two front propellers of an airborne craft run with equal velocity even when the speed thereof is varified by the mentioned variablity in order to incline the vehicle into its forward movement. The two rear propellers are also forced to run at equal speeds. In another embodiment the plural deliveries of the flows are utilized to maintain flight of the vehicle when one of the fluid lines breaks or fails to deliver. The features of the arrangements are, that the airborne craft of the invention is easily controllable, does not depart from a desired straight forward flight path and that it will be able to continue a flight or to afford a safe landing, when one of the delivery flows fails.

4 Claims, 13 Drawing Figures

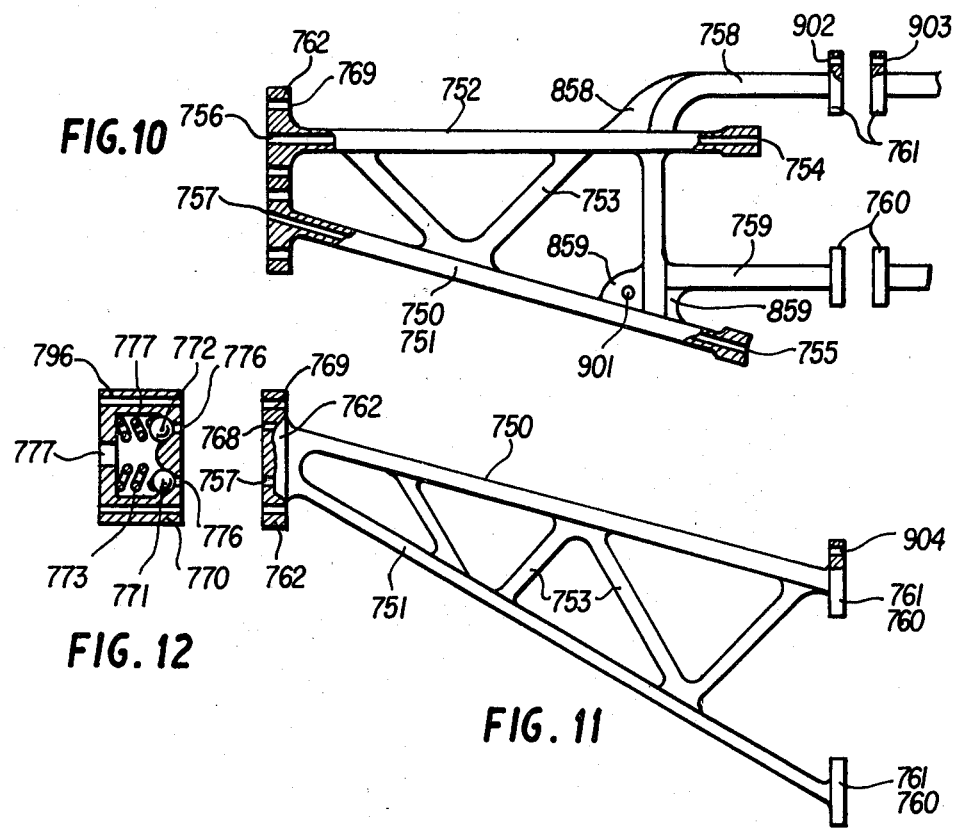
FIG. 10
FIG. 12
FIG. 11
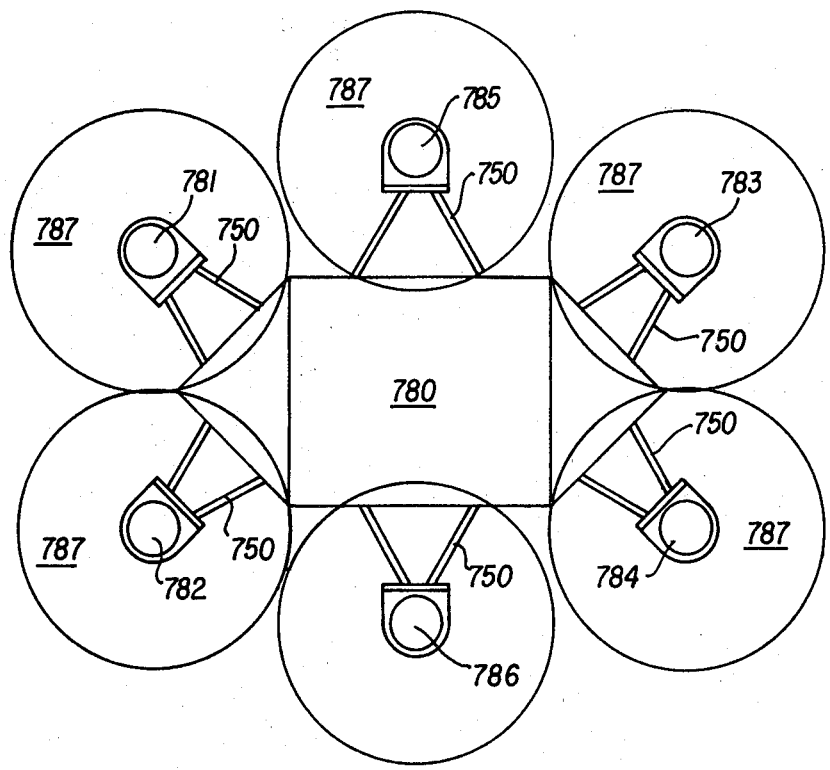
FIG. 13

HYDRAULICALLY OPERATED AIR BORNE ROTOR CRAFT

REFERENCE TO RELATED APPLICATIONS

This is a continuation in part application of my co-pending patent applications Ser. Nos. 800,755 filed on May 26th, 1977 and 800,489 filed on May 25th, 1977, which both were continuation applications of the earlier application Ser. No. 465,413 which was filed on Apr. 30th, 1974 under Austrian priority of number A 3968/73 of May 4th, 1973.

This application is also a divisional application of my co-pending application Ser. No. 954,555 which was filed on Oct. 25th, 1978, now U.S. Pat. No. 4,358,073. Application Ser. No. 954,555 was a continuation application of Ser. No. 800,756 of May 26th, 1977 which also was a continuation of Ser. No. 465,413, mentioned above. The mentioned applications Ser. Nos. 465,413 and 800,756 are now abandoned.

BACKGROUND OF THE INVENTION

The invention deals with hydraulically driven air-borne craft, such as helicopters or like. Such craft are known from a number of my earlier patents. There is however a need for further improvements and partially for simplifications and improvements of safety standards. The invention attempts to do such improvements.

DESCRIPTION OF THE PRIOR ART

Hydraulic drives for propellers of winged aircraft have already been proposed in a number of old patents early in our century. These patents are mentioned as references in my U.S. Pat. No. 3,790,105. It has also already been proposed long ago to drive helicopter rotors by hydraulic drives. The respective patents are mentioned as references in my U.S. Pat. No. 3,405,890. Hydraulic pumps and motors are known in the art and a great number of improved pumps or motors with a great output power per small weight are known from a number of my elder patents.

The earlier patents however generally used one-flow systems and branches of flows out of one flow to drive plural propellers. I have found, that these systems are not safe in operation because they fail to enforce an equalness of rotary velocities of the propellers.

For aircraft and helicopters the propellers should be forced to revolve with equal or proportionate rotary velocities in order to obtain and maintain stability of the craft in the air.

How such stability by equal or proportionate rotary velocities of the propellers can be obtained is basically described in my U.S. Pat. Nos. 3,790,105 and 3,497,162.

However, even these newer patents use single fluid lines to the motors of the propellers of the air-borne craft. Single fluid lines can not provide safety to a vehicle when one of the fluid lines break and in addition the patents of the former art failed to provide an enforced stability of the straight forward movement of vehicle.

The invention attempts to overcome the difficulties of the former art and to provide a vehicle which has a plurality of safeties thereby, that it provides means to assure the possibility of continuance of flight or of the provision of an opportunity for a safe landing when a portion of the hydraulic drive system fails to function properly.

SUMMARY OF THE INVENTION

The object and aim of the invention is to provide a greater safety to hydraulically driven and controlled air-borne craft. In order to obtain this aim and object, the invention provides a number of novel means, either single or in combination, which may become described in a short and concise form as follows:

(A) In a plural rotor craft capable of travel in air, in combination, a structure, at least one hydraulic power supply device with at least four outlets for delivery of at least four separated flows of fluid, at least one front propeller and one rear propeller with substantially upright but inclinable axes, fluid motors to drive said propellers and fluid lines from said outlets to said motors, wherein two of said outlets supply a first set of two flows of fluid of equal rate of flow through separate fluid lines to that of said motors, which drives said at least one rear propeller and two other of said outlets supply a second set of two flows of fluid of equal rate of flow to that of said motors, which drives said at least one front propeller, and, wherein one of said sets of two flows is variable under maintenance of equalness of rate of flow in said one of said sets of flow.

or, as:

(B) The craft of A, wherein said set of flows which is variable is produced in separated working chambers which are adapted to a common controller for equal adjustment of the rates of flow delivered by said separated working chambers.

or, as:

(C) The craft of A; wherein said set of two flows which is variable, is utilized to varify the rotary velocity of at least one of said propellers in order to incline the vehicle forwardly in a desired extent and thereby to control at least partially the desired forward speed of said craft.

or; as:

(D) The craft of B, wherein said controller is utilized to incline the craft forwardly in a desired extent and thereby to control at least partially the forward speed of said craft, whereby said controller of said working chambers is also the controller of the forward speed of said craft.

or, as:

(E) In a plural rotor craft capable of travel in air, in combination, a structure, at least one hydraulic power supply device with at least four ports for delivery of at least two separated flows of fluid, at least one front propeller and one rear propeller with substantially upright but inclinable axes, fluid motors to drive said propellers and fluid lines from said ports to said motors, wherein said motors have each at least one inlet and at least one outlet, said fluid lines are pipes and said fluid lines consist of at least three fluid pipes connected to each of said motors, wherein at least one of said pipes is laterally and another of said pipes is horizontally distanced from the other fluid pipes of the respective motor, wherein stabilizing ribs are provided between said fluid pipes, and, whereby the fluid pipes to the respective motor are forming together with said stabilizing ribs a stable and rigid structure to hold the respective motor and thereby form said structure of said craft. or; as:

(F) The craft of E, wherein said motors have at least three motor-ports whereof two of said motor-ports combine in the respective motor of said motors to communicate in said respective motor with a single control port. or, as:

(G) In a plural rotor craft capable of travel in air, in combination, a structure, at least one hydraulic power supply device with at least four outlets for delivery of at least four separated flows of fluid, at least one front propeller and one rear propeller with substantially upright but inclinable axes, fluid motors to drive said propellers and fluid lines from said outlets to said motors, wherein said motors have each at least one inlet and at least one outlet, said fluid lines are pipes and said fluid lines consist of at least two delivery fluid pipes and at least one return fluid pipe to and from each of said motors, wherein at least two of said pipes of each motor are laterally and horizontally distanced from the other fluid pipes of the respective motor, wherein stabilizing ribs are provided between said fluid pipes, and, whereby the fluid pipes to the respective motor are forming together with said stabilizing ribs a stable and rigid structure to hold the respective motor and thereby form said structure of said craft.
or, as:

(H) The craft of G, wherein said motors have at least two separated inlets, wherein one-way check valves are associated to said inlets and to said delivery pipes to prevent escape of pressure-fluid from the respective motor when one of said delivery fluid lines fails to deliver fluid under pressure to said respective motor.
or, as:

(J) A fluid pipe structure, consisting of at least three pipes with a capability to pass fluid through said pipes, fastening means on the ends of said pipes and ribs between said pipes, wherein at least one of said pipes is a pressure fluid delivery pipe and at least one other of said pipes is a fluid-flow return pipe, wherein said pipes are laterally and vertically distanced from each other, wherein said ribs are provided at suitable locations between some of said pipes to form a rigid structure free of substantial deformations, wherein fastening means provide on one end of said structure means to fasten and carry thereon a hydraulic fluid motor, and, wherein second fastening means of said fastening means are providing means on the other end of said structure to fasten said structure rigidly to a portion of a vehicle with ability to travel in air.
or, as:

(K) The structure of J, wherein a plurality of such structures are fastened to a portion of a body of an air-borne vehicle, each of said structures carries a propeller-driving fluid motor and each of said structures carries at least one flow of fluid from said portion to one of said motors and from said one of said motors back to said portion.
or, as:

(L) The structure of J, wherein an adapter portion is associated to said one end of said structure and that adapter contains at least one one-way check valve to prevent return flow of fluid through the respective pipe of said structure.
or, as:

(M) A vehicle capable of travel in air includes a body-structure, propellers with substantially upright axes, fluid motors to drive said propellers, a prime mover, a pump means driven by said prime-mover and fluid lines from said pump means to said fluid motors;

wherein said propellers are symmetrically disposed with respect to a medial portion of said body structure, wherein said body structure includes holding means for holding said motors, wherein said motors hold and drive said propellers, wherein said fluid lines pass fluid from said pump means to said motors, wherein said motors include at least four rotors, wherein said pump means includes at least four separated working chamber groups of pluralities of individual working chambers for the supply of at least four separated flows of fluid out of said pump means, wherein each of said fluid lines carries one of said separated flows without communication to the others of said flows from one of said groups to one of said rotors, wherein said groups include at least two fixed chamber groups of fixed displacement and said fixed chamber groups supply fixed flows of relatively to each other equal rates of flow of fluid to drive some rotors of said motors with a fixed rotary velocity, wherein said groups include at least two variable chamber groups of variable displacement and said variable chamber groups supply variable flows of relatively to each other equal rates of flow of fluid to drive some other rotors of said motors with a variable rotary velocity, wherein said variable chamber groups have a variable single common displacement actuator means for the maintenance of the equalness of said rate of flow of fluid of said variable flows, wherein said propellers are two propellers and said motors are two motors, wherein each of said motors contains two rotors, wherein said fixed flows are directed to the rotors of one of said motors and said variable flows are directed to the rotors of the other of said motors and wherein said actuator means of said variable chamber group defines thereby the difference of rotary velocity of said motors and said propellers and wherein said fixed flows and said variable flows are utilized to revolve at least one of said propellers with a fixed rotary velocity and at least one other of said propellers with a variable rotary velocity in order to incline by the control of said variable groups the vehicle in a desired extent in the direction of flight of said vehicle for the control of the forward speed of said vehicle.

As seen from the summary of the invention, the invention mainly aims to provide additional safety of air-borne craft and also, as far as possible to simplify their structures. More details will become apparent from a study of the figures and of the description of the preferred embodiments.

BRIEF DESCRIPTION OF THE DRAWINGS

FIG. 10 shows a fluid pipe structure of the invention partially from the side and partially in section, which may be applied in air borne craft of the invention.

FIG. 11 shows the structure of FIG. 10 seen from above.

FIG. 12 shows an adapter set which can be mounted between the fluid pipe structures and a motor in a sectional view, and, FIG. 13 shows a body of a vehicle whereon a plurality of fluid pipe structures are mounted to carry fluid motors and propellers and thereby to constitute an air borne craft, seen in the figure from above.

GENERAL DESCRIPTION OF THE PREFERRED EMBODIMENTS

Figure 1:
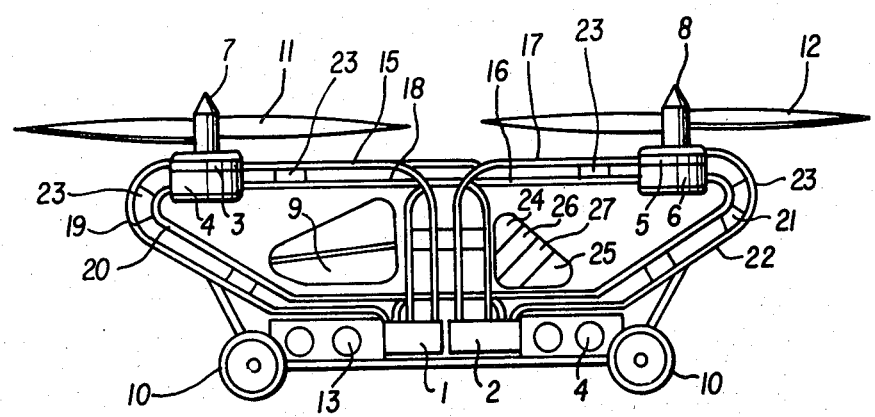
FIG. 1 is a longitudinal view of a vehicle of the invention, seen from the side.
Figure 2:
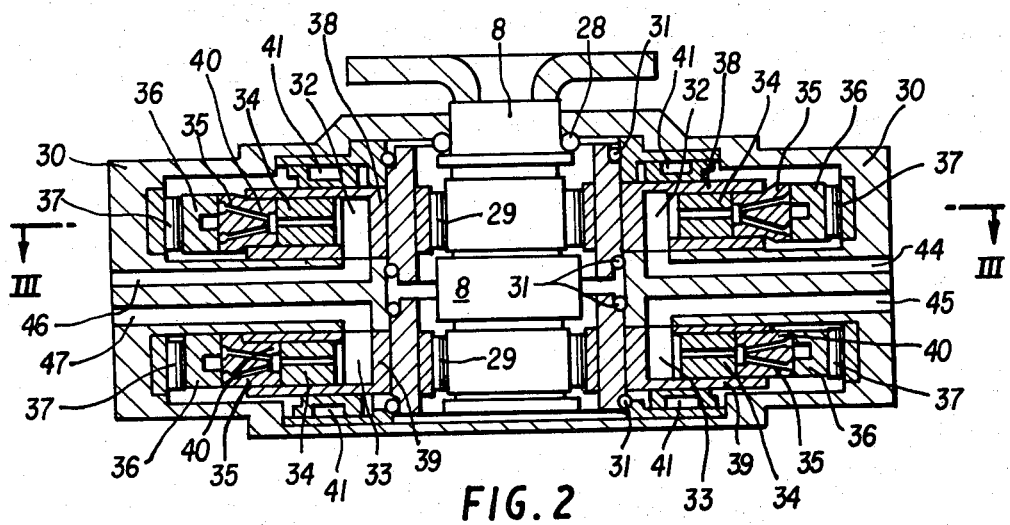
FIG. 2 is a longitudinal sectional view through a fluid motor of one of my patents, which may be utilized in the vehicle.
Figure 3:
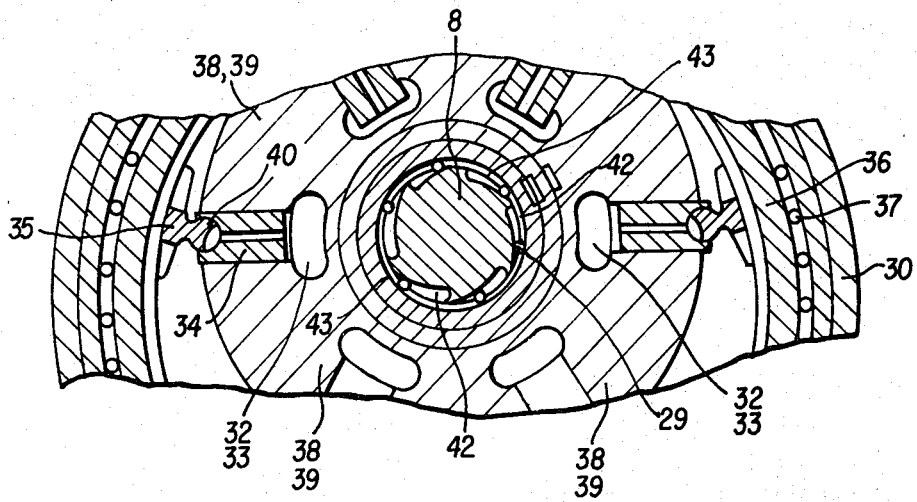
FIG. 3 is a partial cross-sectional view through FIG. 2 along the line III—III.

Referring to the drawings in particular, the invention embodied therein, as shown in FIG. 1, comprises a combined vehicle for traveling in the air and rolling on the ground. In accordance with the invention, the vehicle includes a body structure including the pilot's cabin 9 and an undercarriage including wheels 10. The driving system comprises driving engines 13 and 14, such as internal combustion engines, gas turbines, or the like, hydraulic pumps 1 and 2, hydraulic conduits 15–22, two rotary hydraulic motors which include rotors 3 and 4, and 5 and 6, respectively, driving shafts 7 and 8, and propellers 11 and 12. The hydraulic pumps furnish each two separated pressure fluid flows, whose rates of flow are equal or in a fixed proportion, to each other. Wheels 10 may also be driven by hydraulic motors and switching valves may be provided for alternately connecting the hydraulic circuits to the wheels. The cabin 9 may also receive passengers or cargo. Fuel tanks 26 and 27 are provided, and tanks 24 and 25 are provided for the hydraulic fluid. Advantageously, one tank of hydraulic fluid is provided for at most one or two hydraulic circuits, so that in case of failure of one of the tanks or rupture of one of the lines, only one circuit is interrupted and the other circuit or circuits can still be supplied from their associated fluid tanks. Shafts 7, 8 are parts of the motors 3,4 or 5,6. The construction of the hydraulic motors is illustrated in FIGS. 2 and 3. As for the circuits, the first pressure fluid flow passes from pump 1 through an uninterrupted pressure fluid line 15 to and through the rotor 3 of motor 3, 4 and through a return line 19 back to the pump 1. The second pressure-fluid flow of the hydraulic pump 1 passes through an uninterrupted pressure fluid line 16 to and through the rotor 6 of hydraulic motor 5, 6 and through a return line 21 back to the pump 1. From pump 2, the first pressure fluid flow passes through an uninterrupted pressure fluid line 17 to and through rotor 5 of the hydraulic motor 4, 6 and through a return line 22 back to the pump 2. The second pressure fluid flow of hydraulic pump 2 passes through an uninterrupted pressure fluid line 18 to and through rotor 4 of hydraulic motor 3, 4 and through a return line 20 back to the pump 2. Supporting ribs 23 may be provided between the individual pressure fluid lines.

Owing to the arrangement, according to FIG. 1, even if one of the driving engines 13 or 14 fails, hydraulic motors 3,4 and 5, 6 and thereby, the propellers 11 and 12, continue to be driven by the other engine and pump and by the hydraulic motors associated therewith. Also, in case of failure of one of the rotors in the hydraulic motors, the other rotor continues to rotate because the stopped rotor disengages from the propeller driving shaft 7 or 8 due to the coupling, illustrated in FIGS. 2 and 3. The reliability in operation obtained by the described arrangement in accordance with the invention, is also applied to the other embodiments of the invention, only the description of the system is not repeated in the text hereinafter. However, all of the systems used in other embodiments are derived from this basic system illustrated in FIG. 1 and designed analogously.

Referring to FIGS. 2 and 3, the pressure fluid operated motor, in accordance with the invention shown therein, is a rotary motor of the radial-piston type which comprises, a common housing 30, a driver shaft 8 and two rotors 38 and 39 coupled thereto. Each of the rotors 38 and 39 is rotatably mounted in bearings 31 and is formed with working chambers or cylinders 32, 33 cooperating with displacers or pistons 34. Pistons 34 are operatively connected to guide members, such as piston shoes 35, through which they slide on and apply against guiding surfaces, for example, rotary reaction rings 36. The eccentricity of rotors 38 and 39 in respect to the reaction rings 36 imparts a rotary motion to the respective rotor 38 or 39, in synchronism with the feeding of the pressure fluid through the inlet passages 46 and 47 or 44 and 45 to the cylinders 32 and 33. Reaction rings 36 may be mounted rotatably in bearings 37 in a well-known manner. Rotors 38 and 39 may be held in their axial position by bearings 41 provided at the axially outer sides. Between the pistons and their shoes, hydrostatic bearings 40 may be provided which is also known in the art. Up to these features, the motor is a well-known radial-piston machine which, however, is designed with two rotors in tandem and, therefore, provided with double inlet and outlet passages for the pressure fluid separated from each other. In the present embodiment, these inlet and outlet passages are disposed in a new manner and thrust bearings 41 are aligned with the respective axial pressure components, the bearing 41 on the respective one of the rotor sides being associated with the fluid passages or ports 44, 46 and bearings 41 on the other rotor side being associated with the passages or ports 45, 47 of the pressure fluid. Thus, the particular features of this motor are that the two rotors can be subjected to the fluid pressure separately and can rotate independently from each other. In addition, the two coaxial rotors are hollow and cooperating with the common shaft 8. Between the common shaft and each of the rotors 38 and 39, a freewheel coupling, effective in one direction of rotation, is provided which comprises rollers or balls 29 and clamping surfaces 42 which are regularly distributed over the circumference of the respective portion of shaft 8 and cooperate with the opposite bore surface 43 of the rotor. The surfaces 42 are inclined in the circumferential direction with respect to the surface 43 so that narrow converging interspaces are formed therebetween in which the individual rollers or balls are placed. As soon as pressure fluid is supplied to the rotors 38 and 39, both rotors are rotated, for example clockwise, in considering FIG. 3. Thereby, the rollers or balls 29 are entrained by the rotating surface 43, toward the narrow part of the interspaces and wedged between the surface 43 and the respective one of the inclined clamping surfaces 42 of the common shaft 8 so that shaft 8 and the respective rotor 33 or 39 are firmly coupled to each other in the one direction of rotation. Consequently, both rotors 38 and 39 drive the common shaft 8, and their power output is transmitted to any working member connected to shaft 8.

In case one of the rotors 38 or 39 is stopped, for example because of a fracture or jam of one of its component parts, shaft 8 continues to be driven by the other non-defective rotor 38 or 39, the rollers or balls 29 associated with the stopped rotor rolling back on the now alone or faster revolving clamping surfaces 42 and being carried along into the widest portion of the respective interspaces between the surfaces 42 and 43. Thereby, the stopped or decelerated rotor is disengaged from shaft 8, and the other rotor 38 or 39 can continue undisturbed rotating and driving of the shaft 8, and a jerky braking of the working members, wheels, propellers or the like, fixed to shaft 8 upon failure of one of the hydraulic motors is thus prevented. More particularly, crashing of the aircraft caused by a motor getting hot or stuck is thereby avoided.

Moreover, within the scope of the invention, the coupling 29, 42, 43 which in the embodiment shown comes into effect automatically in any case is of importance in still another direction; namely, such a coupling 29, 42 or 43 may be provided between one of the rotors 38 or 39 and the shaft 8 while the other rotor is rigidly fixed to the shaft. Thereby, it can be obtained that during a desired period, both rotors 38 and 39 drive the shaft, and during another period, only the rotor rigidly fixed to the shaft 8 is driving while the other rotor is completely disengaged and practically in non-frictional contact with the shaft. This permits producing either a drive with a high torque when both rotors 38 and 39 are acting on shaft 8, or a high-speed drive with a small frictional resistance when one of the motors 38 or 39 is disengaged from shaft 8 due to the effected uncoupling. The rotor rigidly connected to the shaft 8 assures the drive of the latter in both directions.

As shown in FIG. 1, the vehicle can also run on a highway. To this end, the motors 3 to 6 or the shaft 7 or 8 are adapted to be connected to wheels 10. In such a case, if it is desired to run on the ground with a high torque, i.e., with a high tractive force, the pressure fluid is supplied from a common line or from parallel lines conducting two pressure fluid flows into both rotors 38 and 39 so that, in a joint action of the two rotors, the highest torque is produced. On the other hand, if desired to run fast on a highway which requires a smaller torque, all the pressure fluid previously supplied into the two rotors 38 and 39 is directed into only one of these rotors 38 or 39 for example into the rotor which is rigidly connected to the shaft. Being now supplied with a double volume of pressure fluid, the motor rotates at a correspondingly higher speed. In this manner, the energy of the hydraulic motors connected in series or idling along, which would otherwise be lost, is saved.

There is thus provided a motor which is particularly suited for operating without interruption even if one of its rotors becomes defective, so that aircraft crashes can be prevented, or which may either produce an increased torque by means of two rotors, or should the torque of the other rotor be unnecessary or undesirable, may use only one rotor for driving without having to overcome the friction of two rotors.

The embodiment of FIGS. 4 to 7 demonstrates a plurality of safety features of the invention in combination.

Figure 7:
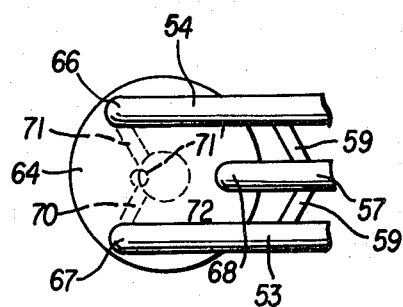
FIG. 7 shows the motor 60 of FIG. 4 in an enlarged scale along the line VII—VII of FIG. 4 and FIG. 7 also shows the motor of FIG. 6 from below and about ninety degrees turned.
Figure 8:
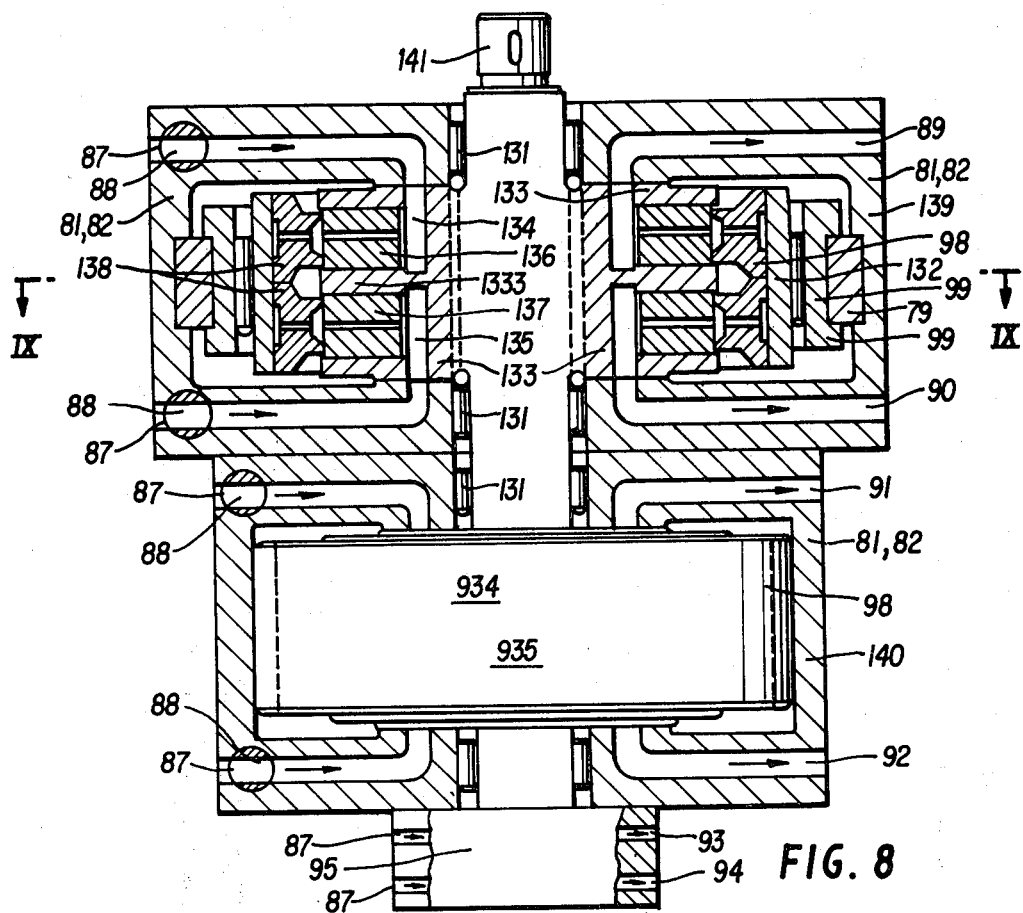
FIG. 8 shows the pump 51 of FIG. 4 in every detail in a larger scale and in a longitudinal sectional view.

It primarily employs a power plant 50 to drive the four-flow pump of FIGS. 7 and 8, which is shown in the figures by referential number 51 with the flow adjustment controller 52 thereon. Controller 52 acts on the control shaft 199 of FIG. 9 for the adjustment of the fluid flow delivery out of ports 91 and 92 of FIG. 8. Pump 51 which may be the pump of FIGS. 8 and 9, delivers two flows of equal rate of flow of fluid through delivery fluid pipes 55 and 56 separately to fluid motor 61 whereon the propeller or rear propeller 63 is fastened and driven by motor 61. The said pump 51, the pump of FIGS. 8 and 9, also delivers two separated flows of fluid out of ports 91 and 92 through separated fluid lines 53 and 54 to the front motor 60, which is also a fluid motor and which carries the front propeller 60 and drives the same.

Figure 4:
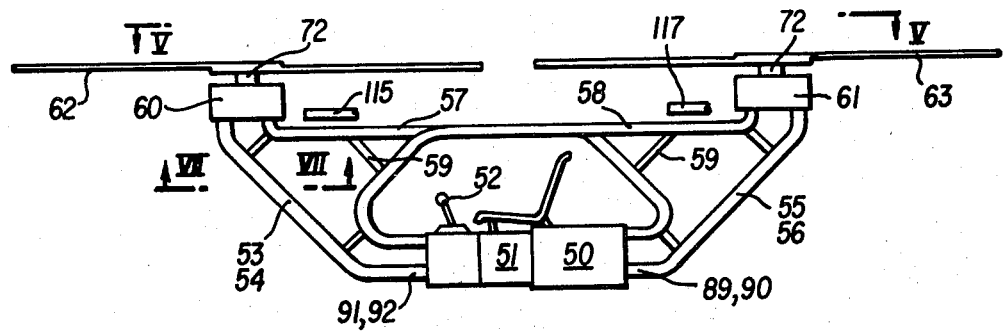
FIG. 4 shows a preferred embodiment of the craft of the invention, seen from the side.
Figure 5:
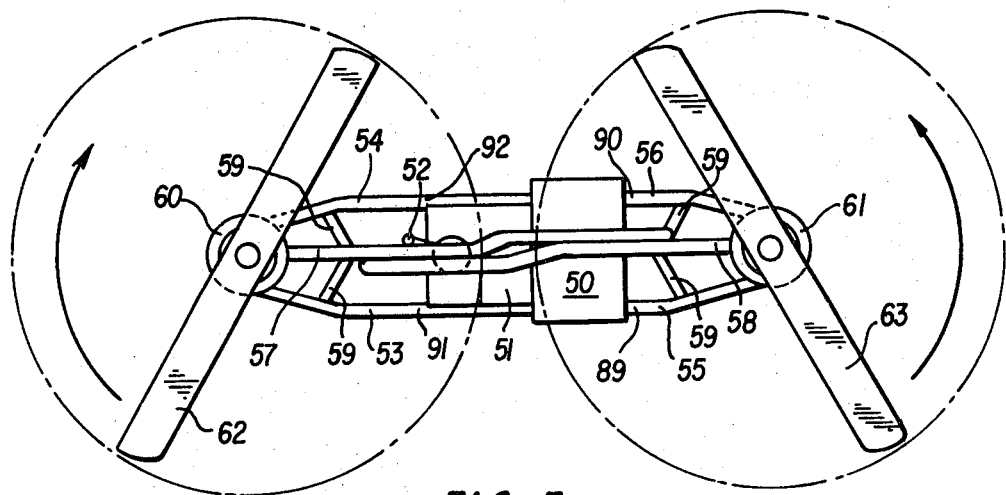
FIG. 5 is a view onto the vehicle of FIG. 4 from above.

Return fluid line 57 returns the fluid from the motor 60 and return fluid pipe 58 returns the fluid from the rear motor 61 directly or over a tank back to the pump 51. Stabilizing ribs 59 are provided at suitable locations between the mentioned fluid pipes 53 to 58 respectively. The propellers may revolve counter directional. The fluid motors may have equal or slightly unequal fluid consumption volumes per revolution. The location of the fluid pipes will best be understood, when FIGS. 4 and 5 are studied together.

Here the first safety feature of the embodiment is apparent. While inventor's elder patents, for example U.S. Pat. No. 3,211,399, employed only two pipes per motor and propeller, one for delivery and one for passing on of fluid, the present embodiment uses at least three pipes, whereof at least one is laterally and at least one vertically distanced from an other pipe. The mentioned elder patent was satisfactory in operation at low speeds and non-turbulent air. For higher speeds however, the different relative velocities and thereby torques and lifts of the propeller blades during forward swing and backward swing, are becoming so considerable, that the pipe structure of the former patent began to vibrate laterally. The embodiment of FIGS. 4 and 5 of the invention overcomes this problem fully and supplies a structure, which does not swing and not vibrate at higher speed or turbulent air. It is stable horizontally and vertically and does not vibrate or swing at all.

The second feature and safety feature of this embodiment of the invention is, that it employs pump 51 with four separated flows of delivery-pressure fluid. Two flows thereof are passed to the rear motor, namely flows 55 and 56 through pipes 55 and 56, whereby they are forming a pair of flows, delivered to the rear motor 61 to revolve by the motor 61 the rear propeller 63. Two more flows are the delivery pressure flows 53 and 54 in pipes 53 and 54, which form an other pair of flows and which are delivered to the front motor 60 to drive the front motor and thereby to drive the thereto associated front propeller 62. The basic feature of this is, that, when one of the fluid lines fails in operation, the other fluid flow and fluid pipe to the respective motor might continue to operate and drive the respective motor. Break or failure of one of the flows does not necessarily mean a reduction of the driving power to half, because the pressure in the remaining healthy flow and pipe may become substantially doubled, when the power plant is still healthy and the motor may then still operate with full power. When the double motors of FIGS. 1 to 3 are used in the craft, it is quite clear from FIGS. 1 to 3, that failure of one pipe-line or fluid-line must not result in a crash. When however conventional fluid motors with only one rotor are used in the craft, it is convenient to use those motors with two separated entrance ports, as for example shown in FIGS. 6 and 7.

Figure 6:
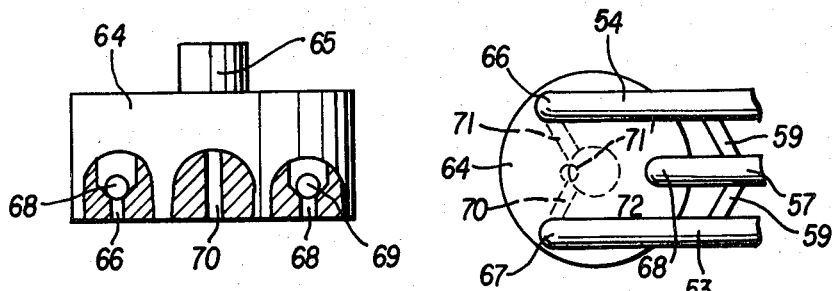
FIG. 6 shows another motor of the invention, partially from the outside and partially in sectional views.

The motors of FIGS. 6 and 7 are in production and widely applied in inventor's experimental craft and in craft of the inventor's customers. Their feature is, that they are forming two separated delivery or motor entrance ports 66 and 67 for connection to fluid pipes 53 and 54 or to fluid lines 55 and 56 of FIG. 4. One-way check-valves 68 and 69 are incorporated into the entrance ports 66 and 67 to prevent return flow from the respective motor, when one of the fluid pipes breaks. The return flow line 70 departs at an other location from the respective motor 64 or like.

In FIG. 7, which is a view from bottom onto motor 60 of FIG. 4, and wherein the motor is named 64 in order to show that it may also be employed in other craft, it is demonstrated how the respective ports are preferredly located on the motor's bottom. Fluid line 54, which is a pressure delivery line, connects to port 66. Delivery pressure line 53 connects to port 67 and return line 57 extends from port 68. What should be recognized in FIG. 7 is, that the ports are located substantially on the corners of a triangle in order to hold the motor 64 fastly and strongly. The ports are not visible in FIG. 7, because when the section in FIG. 4 would be led through the ports, then the pipes would not be visible. It should be seen, that the ports are located on the round ends of the respective pipes where the referential numbers of the ports 66,67 and 68 are shown in the figure. A set of ribs 59 is commonly located close to the motor between the respective pipes to make the piping connection to the motor stable and undeformable. Motor 64 is in the drawing a common motor of the inventor's patent with a single rotor and a single piston group. The dotted lines in FIG. 7 show, that branch-passages 70 and 71 are extending from entrance ports 66 and 67 to a meeting and combining point or space before a single control port 71 in the motor. This technology of a combination of two flows in a motor is highly developed technologically in applicant's research institute and his co-operating manufacturing firms. The dotted circle in FIG. 7 indicates the shafts 72 of the respective motor in FIG. 4.

In one- or two-person craft the fluid pipes 53 and 54 as well as 55 and 56, even they are delivery lines of high fluid pressure are actually of the size of about 16 mm outer and 13 mm inner diameter. They are thereby so very light in weight, that compared to the mentioned elder patent with only two pipes per motor, actually weight is reduced and at the same time the horizontal and vertical stability is obtained.

When the four-flow pump 51 has no shut-off valves, it is recommended to use a second return line 115 or 117 from each motor and separated tanks for each flow as shown in FIG. 1. But, when the four flow pump is the pump of FIGS. 8 and 9, there are shut-off valves 88 in each entrance line of the pump. In such case a single return line 57 or 58 from each motor is satisfactory, because when one of the delivery lines 53 to 56 becomes broken, the respective stop-valve 88 in the pump 51 of FIGS. 8 and 9 can be closed by the pilot and the craft is thereby set to operate only with one delivery line to each motor without major loss of hydraulic fluid in order to continue the flight to an airport or landing place or to afford a safe emergency landing.

Figure 9:
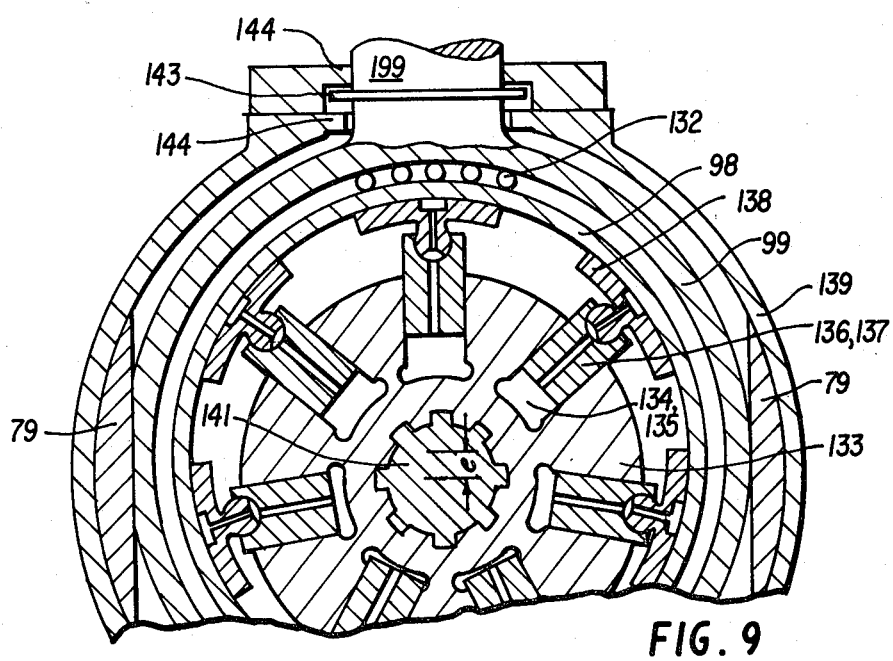
FIG. 9 is a cross-sectional view through FIG. 8 along line IX—IX.

The third safety and convenience feature of the craft of FIGS. 4 and 5 is the application of the pump of FIGS. 8 and 9 as the pump 51 in the craft. The said pump produces and delivers four separated flow of fluid, whereof each two flows are forming a fluid flow pair, whereby the pump delivers two fluid flow pairs. Each fluid flow pair has two flows of equal rates of flow in both flows. One pair of the flows is a fixed displacement flow pair and the other is a variable displacement flow pair. One of the pairs is delivered through two separated fluid lines to the rear motor and the other flow pair is delivered through two separated fluid lines to the front motor.

In the FIGS. 4 and 5 the fluid flow pair of fixed displacement out of ports 89 and 90 of the pump of FIGS. 8 and 9 is delivered through pipes 55 and 56 separatedly to the rear motor 61 to drive the same and its propeller 63. The variable flows of the variable flow pair are separatedly delivered out of ports 91 and 92 of the pump of FIGS. 8 and 9 through the delivery lines 53 and 54 to the front motor 60 to drive the same and its front propeller 62.

The feature of convenience of the mentioned third feature of these figures is, that the common controller 52-99-199 of FIGS. 4,5 and 7,8 can be used to let the front propeller revolve faster or less fast in order to give more or less lift and thereby to incline the vehicle in a desired extent forwardly or backwardly to obtain a desired forward speed or to brake in the air or to fly backwards in the air. Because the mentioned common controller 52, 99,199 varifies the rate of flow of both flows out of ports 91 and 92. The variability of the rate of flow permits the described inclination of the craft by varifying the rotary speed of the front propeller. The further fact, that the controller 52-99-199 is a common controller to two flows, thereby to a flow pair or to the pair of flows out of ports 91 and 92 through delivery lines 53 and 54, has the feature, that equalness of rate of flow is assured in both variable flows 53 and 54.

The safety-feature of the mentioned third feature of FIGS. 4 and 5 is in combination with FIGS. 8 and 9, that, when one of the flows fails, the valves 88 in the pump of FIG. 8 can shut off also one flow of the other pair of flows and the craft can then continue to fly with two flows instead of with two pairs of flows. When the engine is still healthy the single flows instead of the pairs of flows will then get a higher pressure and continue to revolve the motors sufficiently to continue flight, to fly to a landing place or to afford an emergency landing. This mentioned safety feature of the third feature of this embodiment includes the fourth feature, that even, when one flow in each pair of flows is shut-off, the vehicle still remains fully controllable by the common controller 52-99-199 regarding the control of inclination and thereby regarding the control of forward speed, braking in the air and even of backwards flight or—nose-up—move shortly before reaching the ground in case of an emergency landing.

The embodiment of this invention may also be described as follows:

A vehicle capable of travel in air includes a body-structure, 53 to 58, propellers 62,63 with substantially upright axes, fluid motors 60,61 to drive said propellers, a prime mover 50, a pump means 51 driven by said prime-mover and fluid lines 53 to 58 from said pump means to said fluid motors;

wherein said propellers are symmetrically disposed with respect to a medial portion 50,51 of said body structure, wherein said body structure includes holding means 53 to 59 for holding said motors, wherein said motors hold and drive said propellers, wherein said fluid lines 53 to 58 pass fluid from said pump means to said motors, wherein said motors include at least two rotors 72, and four entrance ports of port pairs 66 and 67;

wherein said pump means 51 includes at least four separated working chamber groups 134,135 of pluralities of individual working chambers for the supply of at least four separated flows 89 to 92; 53 to 56; of fluid out of said pump means, wherein each of said fluid lines 53 to 56 carries one of said separated flows without communication to the others of said flows from one of said groups to one of said entrance ports 66,67 wherein said groups include at least two fixed chamber groups 134,135 of fixed displacement and said fixed chamber groups supply fixed flows 55,56 of relatively to each other equal rates of flow of fluid to drive one motor 61 of said motors with a fixed rotary velocity;

wherein said groups include at least two variable chamber groups of variable displacement and said variable chamber groups supply variable flows 91-92, 53-54 of relatively to each other equal rates of flow of fluid to drive another motor 60 of said motors with a variable rotary velocity, wherein said variable chamber groups have a variable single common displacement actuator 98 for the maintenance of the equalness of said rate of flow of fluid of said variable flows, wherein the rate of flow variability of said common actuator is governed by a common controller 52, 99, 199;

and wherein said fixed flows and said variable flows are utilized to revolve at least one of said propellers with a fixed rotary velocity and at least one other of said propellers with a variable rotary velocity in order to incline by the control of said variable groups the vehicle in a desired extent in the direction of flight of said vehicle for the control of the forward speed of said vehicle. or;

wherein said propellers are two propellers and said motors are two motors, wherein each of said motors contains two rotors, wherein said fixed flows are directed to the rotors of one of said motors and said variable flows are directed to the rotors of the other of said motors and wherein said actuator means of said variable chamber group defines thereby the difference of rotary velocity of said motors and said propellers and wherein said fixed flows and said variable flows are utilized to revolve at least one of said propellers with a fixed rotary velocity and at least one other of said propellers with a variable rotary velocity in order to incline by the control of said variable groups the vehicle in a desired extent in the direction of flight of said vehicle for the control of the forward speed of said vehicle.

In FIGS. 8 and 9, a pump which produces four fluid flows is represented, which may advantageously be used in vehicles designed in accordance with the invention. The unit comprises two two-flow pumps mounted axially in tandem on a common shaft of which one is controllable within certain limits as to its delivery so that two and two of the produced flows have rates of flows which are equal or in a fixed proportion to each other. The housings 139 and 140 are flanged to each other, and the shaft 141 carrying the rotors is rotatably mounted in bearings 131 provided in both of the housings. Each of the housings encloses one rotor 133, and each rotor 133 is formed with two groups of delivery chambers or cylinders 134 and 135 in which pistons 136 and 137 are reciprocated by means of a reaction ring 98 with interposed piston shoes 138.

Body portions 1333 of the rotor or fluid handling body 133 remain uninterrupted between two neighbouring working chamber groups 134 and 135 for the separation of the respective working chamber groups 134 and 135 from each other. A stroke adjusting slide block 99 surrounding the reaction ring 98 with an interposed bearing 132 is displaceable, within certain limits, along guides 79 whereby the stroke of the pistons may be varied to a limited extent. The groups of cylinders 134 and 135 are completely separated from each other, and each group has its own fluid inlet passage 87 and fluid outlet passage 89 to 92, respectively. The pressure fluid inlet and outlet passages cannot communicate with each other. Flow volume regulators 88 may be mounted in the inlet passages in case that the stroke adjusting slide block 79, 99 is not provided. The other housing 140 encloses the same members, i.e., the rotor block with groups of cylinders, pistons, piston shoes, and only the reaction ring 98 is not adjustable. In the figure, this reaction ring 98 is shown in an elevational view. The part mounted in the housing 140 has its own inlet passages 87, if necessary, with flow regulators 88 mounted therein and two mutually separated and non-communicating fluid outlet passages 91 and 92. A priming device 95 having inlets 87 and two separate outlets 93 and 94 may be provided at the end of the pump. In this case, the outlets 93 and 94 lead to the inlets of the main pump. The outlet passages 89, 90, 91 and 92 are connected each to one of the hydraulic motors of the vehicle through pressure fluid lines. Owing to this arrangement, a fixed proportionality, in particular equality, of the rates of flow in all of the four circuits is assured, with two of the flows being jointly adjustable.

A common controller 52, shown in FIGS. 4 and 5, may be assembled onto rate of flow adjustment means portion 199. Referential numbers 934 and 935 indicate the separated working chamber groups in pump portion 140, which are not directly visible in the figure, because they are within the shown actuator 98. These chamber groups 934 and 935 are build similarly or equal to chamber groups 134 and 135.

In the embodiment of FIGS. 10 and 11 a pipe structure is demonstrated, which consists of fluid lines, likely thin walled steel, titanium or other pipes. The feature of this embodiment of the invention is, that the fluid lines are building the aircraft structure at least partially, so, that a further structure may be spared. That saves weight and drag during flight. It makes the vehicles less expensive, more light and more speedy in flight. The embodiment shows, that, when at least three fluid lines are used, for example two delivery fluid lines and one or more back fluid lines, the arrangement of the fluid lines can be done in such a way, that the fluid lines alone with a few stabilizing ribs between them can provide a complete holding portion for holding a propeller motor and thereby the respective propeller. Moreover the embodiment of these figures demonstrates, that the holders, built by stable fluid pipes, can be supplied as separately transportable members, which may at will be bolted or fastened to aircraft, helicopters, gyrocopters or like and whereonto the fluid motors can be respectively fastened. In a preferred example of the embodiment, demonstrated in FIGS. 10 and 11 the delivery fluid lines 750 and 751 can be fastened or are fastened to a flange means 762. The return fluid line(s) 752 can be fastened or is fastened, for example welded, to the same flange 762. Said flange may have fastening means, for example bores 769 for fastening of the respective fluid motor to said flange 762. On the other end the fluid lines may have connecting means, for example threads 754 or 755 for connection to flexible fluid line hoses or for connection to the pumps or other fluid line extensions. Ribs 753 may be fastened to either of the fluid lines for providing a stable structure. On the other ends of the said fluid lines, the arms 758 or 759 may be provided and they may have further fasteners 760 or 761. The feature of the arms 758 and 759 is, that they are bending partially laterally away from the respective fluid line to bend thereafter into straight portions, which are distanced from the respective fluid line end and extend substantially parallel to the respective fluid line. Thereby it is possible, to maintain straight and unbent fluid lines 750 to 752. This is very convenient, because straight fluid lines can easily be cleaned out inside. That is important for a safe operation in order, that no dirty matter can enter into the pumps or motors. Under these circumstances it is possible to weld the flanges, fasteners, ribs and like onto the fluid lines and thereafter clean the inside of the straight fluid lines from welding dust and like. Fasteners 760 and 761 are provided in order to fasten to sets respectively together or to fasten the fluid line arrangement to the body of the vehicle.

In FIG. 12 a combination set for the combination of two or more delivery flows into a single motor entrance port is demonstrated and shown in a longitudinal sectional view. It makes it possible to set the multiple delivery pipe set of FIGS. 10 and 11 onto a conventional fluid motor. Housing 770 has the entrance ports 775 and 776 formed matching with the exit ports 757 and 768 of the fluid line structure of FIGS. 10 and 11. Fasteners or bores 796 in housing 770 are preferredly also matching with the respective bores 769 in flange 762 of the fluid line structure and also with respective bores or threads in the respective fluid motor. Exit port 777 matches with the respective entrance port of the respective fluid motor. One-way flow valves, often called check-valves 771 and 772 are provided to the entrance ports 775 and 776 for opening, when delivery fluid comes from the fluid lines 750 and 751 and for closing, when no flow comes. Thus, when one of the fluid lines 750 or 751 breaks, the respective one way valve 775 or 776 remains closed, so, that no fluid from the remaining healthy fluid line can escape, and thus, the motor can be still supplied with fluid and drive the respective propeller, even when one of the delivery fluid lines 750 or 751 breaks. This arrangement provides an effective safety to any vehicle, whereto the arrangement of the invention is applied. Spring means 773 and 774 are provided to assure the closing of the one way valves 771 and/or 772. The arrangement of this FIG. 12 may be a separated part or it may be a portion of the fluid line structure of FIGS. 10 and 11 or it may be a portion of a respective fluid motor.

In FIG. 13 is in a view from above simplifiedly shown and demonstrated, how the structures of FIGS. 10 and 11 each separately or combined together may be fastened to a vehicle's body, thereby forming a complete craft. Body 780 may have fastening means, for example threads or bores for fastening of the respective flanges 760, 761 to body 780. Shown are six fluid pipe structures 750 and six fluid motors 781 to 787 attached to fluid line structures 750. Propeller blade circles 787 demonstrate, how for example a complete helicopter or gyrocopter may be assembled from the parts demonstrated in this specification. Instead of six units, there may be two, one, four or any plurality depending on design of the craft. In FIG. 10 is demonstrated how two pipe line structures 750 might be fastened symmetrically to each other to form a two propeller craft.

One of the important features of the embodiment of FIGS. 10 and 11 is, that the arms 758,759 are extending slightly away from the entrance ends 754,755 in order to permit straight fluid flow and easy cleaning of the inside of the pipes 752, 750,751. But in addition this slight extending away from the entraces also permits additional stability and easiness of assembly of the structure to other structures or to vehicles. The arms 758,759 may actually also be pipes as 750 to 752 are, but they do not carry fluid. They are empty inside. In the structure it is not good to weld only pipe arm 758–759 onto the pipes 750 to 752, but to weld stabiliser plates or ribs 858 and 859 too. Because long welding lines are desired to prevent any deformation and to prevent any breaking of the welded structure. The plate or rib 859 may get a hole 901 for the purpose of hanging a cabin or the engines and pumps of the vehicle thereon. The end flanges 760,761 of the holders or arms 758,759 or of the pipes 750,751 may have bores 902 to 903 for fastening of said flanges and thereby of the structure by bolts or rivets or like to another structure or to a vehicle. For example, two structures of FIGS. 10 and 11 may be fastened back to back in opposite directions by bolts or like through bores 902, 903. They then are forming a complete vehicle for two propellers, whereby the cabin and power means can be fastened through the then at least double available bores 901.

I claim:

1. A fluid pipe structure, consisting of at least three pipes with a capability to pass fluid through said pipes, fastening means on the ends of said pipes and ribs between said pipes,
    wherein at least one of said pipes is a pressure fluid delivery pipe and at least one other of said pipes is a fluid-flow return pipe,
    wherein said pipes are laterally and vertically distanced from at least one other pipe,
    wherein said ribs are provided between some of said pipes to form a rigid structure free of substantial deformations,
    wherein first fastening means are provided on one end of said structure means to fasten and carry thereon a hydraulic fluid motor, and,
    wherein second fastening means of said fastening means are providing means on the other end of said structure to fasten said structure rigidly to a portion of a vehicle with ability to travel in air,
    wherein the interior spaces of said pipes extend through said first and second fasteners,
    wherein said pipes are substantially straight pipes which exclude sharp bendings of said pipes to permit the easy passing of a cleaner through said interior spaces of said pipes,
    wherein said pipes are provided with arms, which are individually rigidly fastened to a respective pipe of said pipes, wherein said arms are extending partially slightly laterally away from said pipes to bend thereafter into straight portions which are directed substantially parallel to said pipes, and, wherein third fastening means are provided on the ends of said arms to fasten said structure to a respective means, whereon said structure shall be held, whereby said third fastening means are separate of said second fastening means, whereby said pipes are capable to permit the cleaning of the interiors of said pipes through said first and second fastening means and said pipes permit the fastening of fluid line extensions to said second fastening means without disconnection of said third fastening means.

2. The structure of claim 1, wherein a plurality of such structures are fastened to a portion of a body of an air-borne vehicle, each of said structures carries a propeller-driving fluid motor and each of said structures carries at least one flow of fluid from said portion to one of said motors and from said one of said motors back to said portion.

3. The structure of claim 1, wherein an adapter portion is associated to said one end of said structure and that adapter contains at least one one-way check valve to prevent return flow of fluid through the respective pipe of said structure.

4. A fluid pipe structure, consisting of at least three pipes whereof at least two pipes are fluid line pipes with a capability to pass fluid through said fluid line pipes, fastening means on the ends of said pipes and ribs between said pipes, wherein at least one of said pipes is a pressure fluid delivery pipe and at least one other of said pipes is a fluid-flow return pipe, wherein said pipes are laterally and vertically distanced from at least one other pipe, wherein said ribs are provided between some of said pipes to form a rigid structure free of substantial deformations, wherein first fastening means are provided on one end of said structure means to fasten and carry thereon a hydraulic fluid motor, and, wherein second fastening means of said fastening means are providing means on the other end of said structure to fasten said structure rigidly to a portion of a vehicle with ability to travel in air, wherein the interior spaces of said fluid line pipes extend through said first and second fasteners, wherein said pipes are substantially straight pipes which exclude shape bendings of said pipes to permit the easy passing of a cleaner through said interior spaces of said pipes, wherein said pipes are provided with arms, which are individually rigidly fastened to a respective pipe of said pipes, wherein said arms are extending partially slightly laterally away from said pipes to bend thereafter into straight portions which are directed substantially parallel to said pipes, and, wherein third fastening means are provided on the ends of said arms to fasten said structure to a respective means, whereon said structure shall be held, whereby said third fastening means are separate of said second fastening means, whereby said fluid pipes are capable to permit the cleaning of the interiors of said fluid line pipes through said first and second fastening means and said fluid line pipes permit the fastening of fluid line extensions to said second fastening means without disconnection of said third fastening means.

* * * * *